US011509436B2

(12) United States Patent
Akoum et al.

(10) Patent No.: US 11,509,436 B2
(45) Date of Patent: Nov. 22, 2022

(54) FACILITATION OF ENHANCED CHANNEL STATE INFORMATION ESTIMATION FOR 5G OR OTHER NEXT GENERATION NETWORK

(71) Applicant: AT&T Intellectual Property I, L.P., Atlanta, GA (US)

(72) Inventors: Salam Akoum, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 171 days.

(21) Appl. No.: 17/106,672

(22) Filed: Nov. 30, 2020

(65) Prior Publication Data

US 2022/0173855 A1    Jun. 2, 2022

(51) Int. Cl.
 *H04W 4/00* (2018.01)
 *H04L 5/00* (2006.01)
 *H04W 72/04* (2009.01)

(52) U.S. Cl.
 CPC ....... *H04L 5/0048* (2013.01); *H04W 72/0446* (2013.01)

(58) Field of Classification Search
 CPC . H04L 5/0048; H04L 1/0001; H04L 25/0222; H04L 25/0224; H04W 72/0446
 USPC ........................................................ 370/330
 See application file for complete search history.

(56) References Cited

U.S. PATENT DOCUMENTS 8,774,294 B2 * 7/2014 Shental ............... H04L 25/0202
375/260

FOREIGN PATENT DOCUMENTS

WO    WO-2021254636 A1 * 12/2021

OTHER PUBLICATIONS

Xin et al. ( MU-ID: Multi-user Identification Through Gaits Using Millimeter Wave Radios) (Year: 2020).*
Mingjin Wang (An overview of Enhanced Massive MIMO with Array signal Processing Techniques) (Year: 2019).*

* cited by examiner

*Primary Examiner* — Maharishi V Khirodhar
(74) *Attorney, Agent, or Firm* — Amin, Turocy & Watson, LLP

(57) ABSTRACT

A delay doppler domain transformation can be used to estimate characteristics of a channel between a base station and a user equipment or alternatively, between the user equipment and another user equipment. Thus, the velocity and the distance position of the user equipment can be calculated. For example, a signal received in the time-frequency domain, can be converted to the delay doppler domain by the base station. In response to the conversion, the base station can estimate the velocity of the user equipment. The velocity can be utilized by various applications. For example, the velocity can be utilized to alert the other user equipment to the location or an anticipated location of the user equipment.

20 Claims, 10 Drawing Sheets

FACILITATION OF ENHANCED CHANNEL STATE INFORMATION ESTIMATION FOR 5G OR OTHER NEXT GENERATION NETWORK

TECHNICAL FIELD

This disclosure relates generally to facilitating of enhanced channel state information. For example, this disclosure relates to facilitating enhanced channel state information estimation for sensing and ranging in millimeter wave new radio for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating enhanced channel state information estimation for sensing and ranging in millimeter wave new radio is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
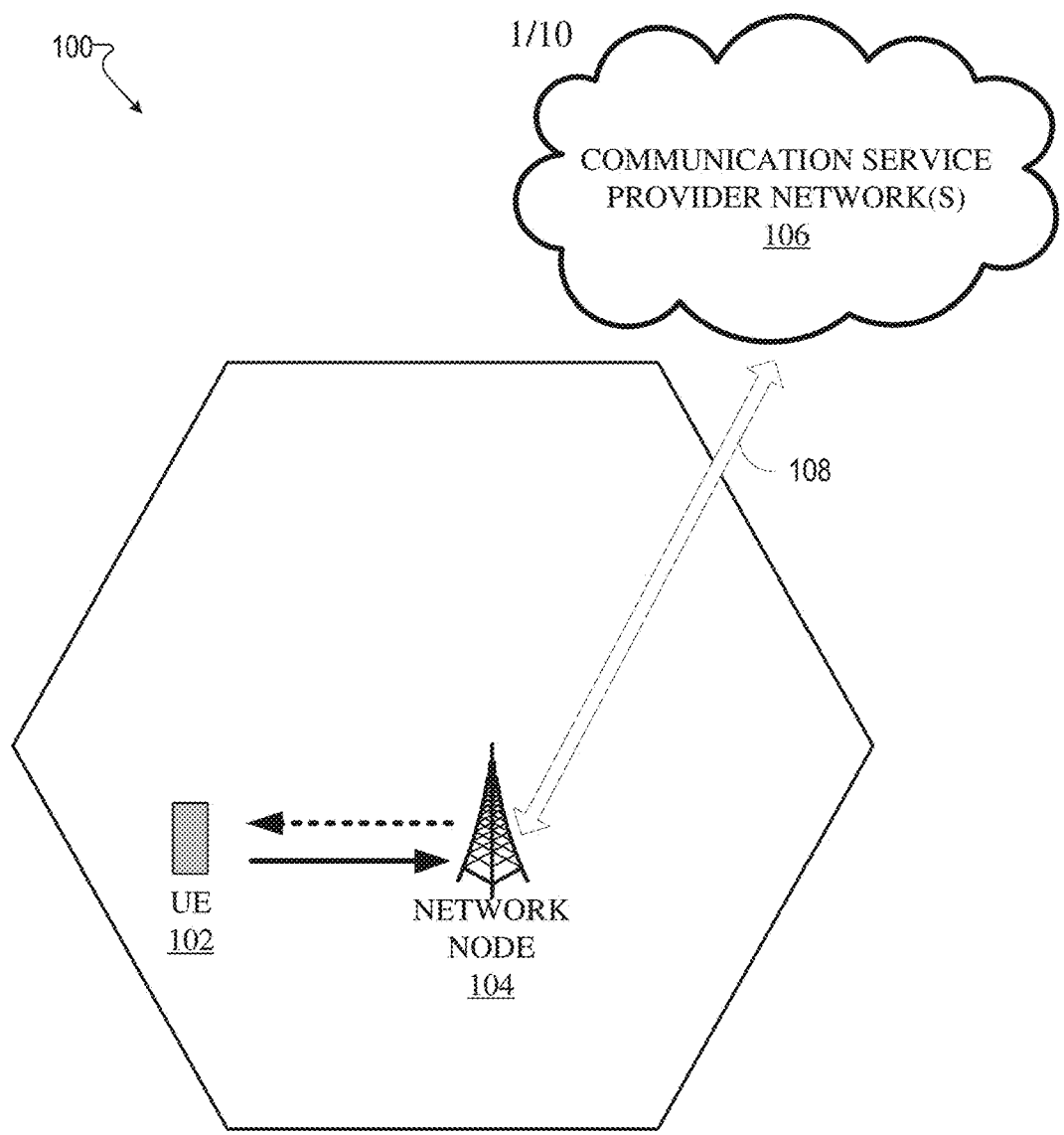
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate enhanced channel state information estimation for sensing and ranging in millimeter wave new radio for a 5G air interface or other next generation networks. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be desired to implement the methods. In addition, the methods could alternatively be represented as a series of interrelated states via a state diagram or events. Additionally, the methods described hereafter are capable of being stored on an article of manufacture (e.g., a machine-readable medium) to facilitate transporting and transferring such methodologies to computers. The term article of manufacture, as used herein, is intended to encompass a computer program accessible from any computer-readable device, carrier, or media, including a non-transitory machine-readable medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate enhanced channel state information estimation for sensing and ranging in millimeter wave new radio for a 5G network. Facilitating enhanced channel state information estimation for sensing and ranging in millimeter wave new radio for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, IOT device, laptop embedded equipped (LEE), laptop mounted equipment (LME), USB dongles, etc. The embodiments are applicable to single carrier as well as to multicarrier (MC) or carrier aggregation (CA) operation of the UE. The term carrier aggregation (CA) is also called (e.g.

interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves a UE or network equipment connected to other network nodes or network elements or any radio node from where UE receives a signal. Non-exhaustive examples of radio network nodes are Node B, base station (BS), multi-standard radio (MSR) node such as MSR BS, eNode B, gNode B, network controller, radio network controller (RNC), base station controller (BSC), relay, donor node controlling relay, base transceiver station (BTS), edge nodes, edge servers, network access equipment, network access nodes, a connection point to a telecommunications network, such as an access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

5G, also called new radio (NR) access, networks can support the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Radio-access network (RAT) dependent positioning techniques that achieve centimeter level accuracy in 5G networks rely on enhancements on reference signals on the downlink and on uplink, that can use a lot of overhead. These positioning techniques, unlike other RAT independent techniques such as LiDAR or sensor based techniques, do not rely on the presence of line of sight to achieve the needed accuracy. Positioning techniques that are radio access network based, and not user based, rely on uplink reference signals to be sent to the serving and neighboring base stations to localize the mobile device. In 5G and LTE, these reference signals are the sounding reference signals (SRS) for timing based techniques such as uplink—time difference of arrival (UL-TDoA) and angle based techniques such as UL AoA (angle of arrival). Instead of increasing the overhead of the SRS to achieve better localization, we propose a localization technique whereas the base station receives a reference signal in the time frequency domain, and converts the signal to a delay doppler domain. When a channel is represented in the delay doppler domain, it is less sparse and more time invariant as compared to a representation of that channel in the time frequency domain. Thus, representation in the delay doppler domain can allow important information to be extracted with lower overhead of the reference signal. The delay doppler perspective can decrease variance of the data and reduce the amount of data needed to make computations. On the uplink, reference signals in the time frequency domain can be converted to the delay doppler domain at the base station device(s). Then, the location, velocity, and/or angle information about the user device can be extracted from the delay doppler representation of the channel. Reference signals can also be generated in the delay doppler domain and converted to time frequency domain at the UE, before being sent to the base station. The base station then implements the conversion back to the delay doppler domain. A large spreading gain in the time and frequency domain can allow for extraction of the location, velocity, angle, and/or other information about the user equipment. Note that these methods, i.e., design of the reference signals in the time domain and conversion to the delay domain at the receiver, or design of the reference signals in the delay doppler domain and conversion at the transmitter, can be performed on the downlink as well, for UE-based positioning techniques.

Accurate estimation of the range and velocity of user equipment is one of the pillars to enable use cases such as autonomous driving, cloud augmented reality (AR), virtual reality (VR), industrial internet of things (IIoT), and emergency services. Laser technology (Lidar) and other sensors integrated into smartphones, in addition to other radio access network (RAT) independent techniques such as Wi-Fi signals, Bluetooth signals, etc. have been traditionally exploited for indoor positioning and mapping applications, as well as outdoor positioning to augment the global navigation satellite systems (GNSS) localization. Such solutions, however, are not always reliable and/or scalable. Cellular signals have been used to improve positioning accuracy over global navigation satellite systems (GNSS) since 2G. LTE introduced timing based techniques such as downlink (DL)—time difference of arrival (TDoA) and uplink (UL)—TDoA and angle based techniques that take advantage of either transmitting beamforming of signals and/or differences of phase across received antenna elements to determine the angle between a transmitter and receiver pair. LTE-based localization, however, does not provide the accuracy for use cases such as IIoT, AR/VR and autonomous driving, that require centimeter level accuracy. This type of accuracy can be enabled by properties available in mmWave technology and 5G.

5G NR is uniquely positioned to provide enhanced localization capability. Operation in higher carrier frequencies, availability of wide transmission bandwidth on the order of hundreds of MHz, in addition to the utilization of massive antenna arrays, and network densification, present a great opportunity to substantially improve the positioning accuracy in cellular networks. Positioning in 5G relies on positioning reference signals on the DL for DL-based positioning such as DL-TDoA, and sounding reference signals for UL-based positioning, such as UL-TDoA. The positioning accuracy in these techniques depend on multiple factors such as the network densification, the propagation environment, and the properties of the reference signals. Significant improvements in positioning accuracy can be achieved by appropriate design of the reference signals used for positioning.

Localization in 5G can meet stringent requirements on horizontal and vertical positioning accuracy. Such requirements cannot be met without improvements and modifications to the existing localization techniques and reference signals in cellular networks. The usage of mmWave frequencies, with frequencies that can go up and beyond 100 GHz, provides a significant venue for localization improvements, through the use of large bandwidths, massive antenna arrays and network densification. Proposed positioning solutions for NR rely on time difference of arrival either on the downlink, with the use of a positioning reference signals (PRS), or uplink, with the use of sounding reference signals (SRS).

Using solutions that are not UE based but rather UE-assisted or radio access network (RAN) based where the UE sends the reference signals to the base station to estimate the range and velocity, are beneficial to reduce the complexity at the UE side. UL-TDOA solutions in LTE rely on SRS. For NR, enhancements on the SRS design are proposed to improve the positioning accuracy and resolution. SRS design in NR allows for a better flexibility and higher density than that in LTE. Nevertheless, this comes at a cost of higher overhead. Furthermore, the techniques in NR can suffer from synchronization error, calibration error, and time difference error that hinder the performance of these techniques.

SRS for UL-based techniques in NR and LTE is transmitted orthogonal to the data in time and frequency grid. Thus, a certain number of resource elements (RE) in the time frequency domain must be allocated for the SRS transmission. Those REs used for SRS cannot be used for data, hence becoming overhead to the system. A typical solution to resolve this issue would be to overlay the RS and the data on the same RE, with non-orthogonal multiplexing, thus creating interference between the RS and the data. While data is much more resistant to interference, RS estimation accuracy suffers from sensitivity to interference. This overlay might suffer a performance loss.

Furthermore, being able to rely on a sparse form of the channel is greatly beneficial in improving the accuracy of positioning, as well as in the reference signal design. Sparsity means that it might be easier to identify and track channel components that can be used for high precision positioning. It can also translate to an increased signal interference-to-noise ratio (SINR), as it is easier to resolve the important individual components, while the clutter acts as interference.

This disclosure proposes a new framework and reference signal design for positioning in 5G. Channel state information can be converted from traditional frequency time domain to delay doppler domain, and then the delay doppler domain can be used to estimate ranging, velocity, and angle parameters for localization. Using the delay doppler domain transformation, characteristics of the channel can be estimated, and thus the velocity and the distance between the transmitter and the receiver can be estimated with a higher accuracy, given the sparsity and the invariance of the channel in the delay doppler domain. This results in reducing the estimation error for positioning, and improving the accuracy to the centimeter level, without requiring much densification in the reference signal design, which can decrease the overhead needed for localization.

In one example, positioning can be performed on the UL, where the base station estimates the channel response from the UE. The delay doppler channel response can be used to estimate the range (distance) of the UE, its velocity, and/or the angle of arrival of the signal from the UE. The base station can estimate the channel response in delay doppler domain. The estimation can be based on the received reference signal (RS). The RS can be designed in two different ways.

In one embodiment, the reference signal can be generated in the traditional frequency time domain, in which case, the base station can estimate the channel response in time-frequency domain and then transform the channel response from time frequency domain to the delay doppler domain. An example of the transformation function is a symplectic finite Fourier transform (SFFT).

In another embodiment, the reference signals can be generated in the delay doppler domain, and transformed to the time frequency domain, in an overlay on the data signals. The channel response can then be estimated by converting to the delay doppler domain.

When the reference signal is designed in the delay-doppler domain, the symplectic Fourier transform can be used to convert the RSs back into time-frequency domain. Let's denote the reference signal as a discrete sequence in the delay-Doppler plane by r(k, l), where k and l correspond to the index in the delay bin and the Doppler bin on the delay doppler grid. The symplectic Fast Fourier transform that transforms r(k, l), back to the time frequency domain can be described as follows:

$$r'(n, m) = \frac{1}{N_{S,\tau} N_{S,v}} \sum_{k=0}^{N_{S,v}-1} \sum_{l=0}^{N_{S,\tau}-1} r(k, l) \, e^{-j2\pi\left(\frac{ml}{N_{S,\tau}} - \frac{nk}{N_{S,v}}\right)} \quad \text{Equation 1}$$

When a reference signal sequence is generated in the delay-Doppler domain, each delay Doppler sample can spread into the time frequency resource elements. Because of the large spreading effect, the processing gain can become large. When the reference signal is overlaid with the data resource elements in the time frequency domain, even though the interference from the data REs is large, the interference can be eliminated by the large processing gain.

In another example, the delay doppler transformation can be applied for DL positioning, where the channel response can be estimated at the UE, using either reference signal designs. In yet another example, the delay doppler transformation can be applied in a cooperative localization, through relative positioning between the UEs, using either of the reference signal designs proposed (e.g., a sidelink use—if there are two cars that are trying to figure out their positions in respect to each other).

Consequently, the delay doppler transformation can provide a more accurate positioning in mmWave with a lower overhead. The sparsity of the channel in the delay doppler domain can be used for higher precision positioning as sparsity translates into an increase in SINR and a decrease in estimation error. The RS design in delay doppler domain effectively has zero overhead since it is overlaid on the data resource elements. As a result, it is possible to use a higher density design in the delay Doppler domain if needed, as well as a larger number of ports.

While the delay domain sampling rate is determined by standardization, the time domain sampling rate and measurement window can be adjustable according to UE velocity, which allows the channel parameters estimation accuracy to be improved depending on the environment, the carrier frequency, bandwidth, and the user velocity. Typically, a higher speed UE may require higher sampling rate in time domain. The ranging reference signal can be spread across a large number of OFDM symbols and a large number of subcarriers, resulting in a large RS sequence, and hence a large received processing gain. This helps in the detection of the RS since it is overlaid with a high-power data transmission. Thus, the processing gain comes for free as the delay doppler based RS is mapped to a large number of REs in the time frequency grid.

The overall applicability of this technique can be used for sensing and ranging applications. The velocity estimation can be used to determine how fast an object is moving and in which direction. For example, a 5G or next generation wireless system equipped with the proposed technology can detect an incoming flying object (e.g., drone), and accurately detect how fast the drone is moving and in which direction. Similarly, this can be applied to other scenarios where the object of detection is a vehicle, such as a car. In other scenarios, (e.g., indoor spaces) the object of detection can be a person moving in a mall. In a combat scenario, the object can be an enemy vehicle or soldier advancing for an attack. Thus, there are many ways in which the velocity estimation could be used.

Additionally, the velocity information (e.g., speed+direction) can be used in different ways depending on the positioning client (e.g., the client can be the entity that requests the info). That client can be hosted on a UE (e.g., a phone trying to access an app that needs an accurate location information), outside of the UE, located in the core network, and/or even emergency services such as 911, or other similar entities. Knowledge of such information can also be beneficial for the radio access network for resource allocation, coordination between base stations, antenna optimization, and other scenarios. For the purposes of this disclosure, new methods to determine positioning can be implemented without necessarily affecting that architecture (e.g., irrespective of who the client is). The client can make a positioning request for the target UE, and a positioning server wirelessly connected to the UE can make decisions on the positioning method and the measurements needed at the base station and/or at the UE. The positioning server can collect the information and send the velocity and positioning info back to the client.

In one embodiment, described herein is a method comprising receiving via an uplink channel, by a base station comprising a processor from a first user equipment, a reference signal generated in a time-frequency domain. In response to receiving the reference signal generated in the time-frequency domain, the method can comprise converting, by the base station, the reference signal to a doppler domain, resulting in a converted reference signal. Based on the converted reference signal, the method can comprise estimating, by the base station, a channel response associated with the first user equipment, resulting in an estimated channel response. Additionally, based on the estimated channel response, the method can comprise estimating, by the base station, a position the first user equipment, resulting in an estimated position, wherein the estimated position comprises a horizontal position and a vertical position of the first user equipment, a velocity associated with the first user equipment, resulting in an estimated velocity, and an angle of arrival of the reference signal from the first user equipment, resulting in an estimated angle of arrival. Furthermore, in response to estimating the position, the velocity, and the angle of arrival, the method can comprise sending, by the base station, the estimated position, the estimated velocity, and the estimated angle of arrival to a second user equipment.

According to another embodiment, a system can facilitate, receiving a reference signal, generated in a delay doppler domain, from a first user equipment in an uplink channel. The system can comprise converting by the first user equipment the reference signal, generated in a delay doppler domain, to a time-frequency domain, resulting in a time frequency domain converted reference signal. In response to receiving the reference signal generated in the delay doppler domain, the system can comprise converting the reference signal to a time-frequency domain, resulting in a time-frequency domain converted reference signal. In response to converting the reference signal to the time-frequency domain, the operations of the system can further comprise converting the time-frequency domain converted reference signal to a delay doppler domain converted reference signal. Based on the delay doppler domain converted reference signal, the system can comprise estimating a channel response associated with the first user equipment, resulting in an estimated channel response. Based on the estimated channel response, the system can comprise estimating: a position the first user equipment, resulting in an estimated position, wherein the estimated position comprises a horizontal position and a vertical position, a velocity associated with the first user equipment, resulting in an estimated velocity, and an angle of arrival of the reference signal from the first user equipment, resulting in an estimated angle of arrival. Furthermore, in response to estimating the position, the velocity, and the angle of arrival, the system can comprise transmitting the estimated distance, the estimated velocity, and the estimated angle of arrival to a second user equipment that requested the estimated distance, the estimated velocity, and the estimated angle of arrival.

According to yet another embodiment, described herein is a machine-readable medium that can perform the operations comprising receiving a reference signal via a sidelink generated in a delay doppler domain, from a second user equipment. In response to receiving the reference signal generated in the delay doppler domain, the machine-readable medium can perform the operations comprising converting the reference signal to a time-frequency domain, resulting in a time-frequency domain converted reference signal. The machine-readable medium can perform the operations comprising converting the time-frequency domain converted reference signal to a delay doppler domain converted reference signal. Based on the delay doppler domain converted reference signal, the machine-readable medium can perform the operations comprising estimating a channel response associated with the second user equipment, resulting in an estimated channel response. Based on the estimated channel response, the machine-readable medium can perform the operations comprising estimating: a distance between the first user equipment and the second user equipment, resulting in an estimated distance, a velocity associated with the second equipment, resulting in an estimated velocity, and an angle of arrival of the reference signal from the second user equipment, resulting in an estimated angle of arrival. Furthermore, in response to estimating the estimated distance, the estimated velocity, and the estimated angle of arrival, the machine-readable medium can perform the operations comprising sending the estimated distance, the estimated velocity, and the estimated angle of arrival to a third user equipment in response to a request for the estimated distance, the estimated velocity, and the estimated angle of arrival form the third user equipment.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can include one or more user equipment UEs 102. The non-limiting term user equipment can refer to any type of device that can communicate with a network node in a cellular or mobile communication system. A UE can have one or more antenna panels having vertical and horizontal elements. Examples of a UE include a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also include IOT devices that communicate wirelessly.

In various embodiments, system 100 is or includes a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can include a recommendation to transmit data via a closed loop MIMO mode and/or a rank-1 precoder mode.

A network node can have a cabinet and/or other protected enclosure(s), an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can include wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may include: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are used in 5G systems.

Figure 2:
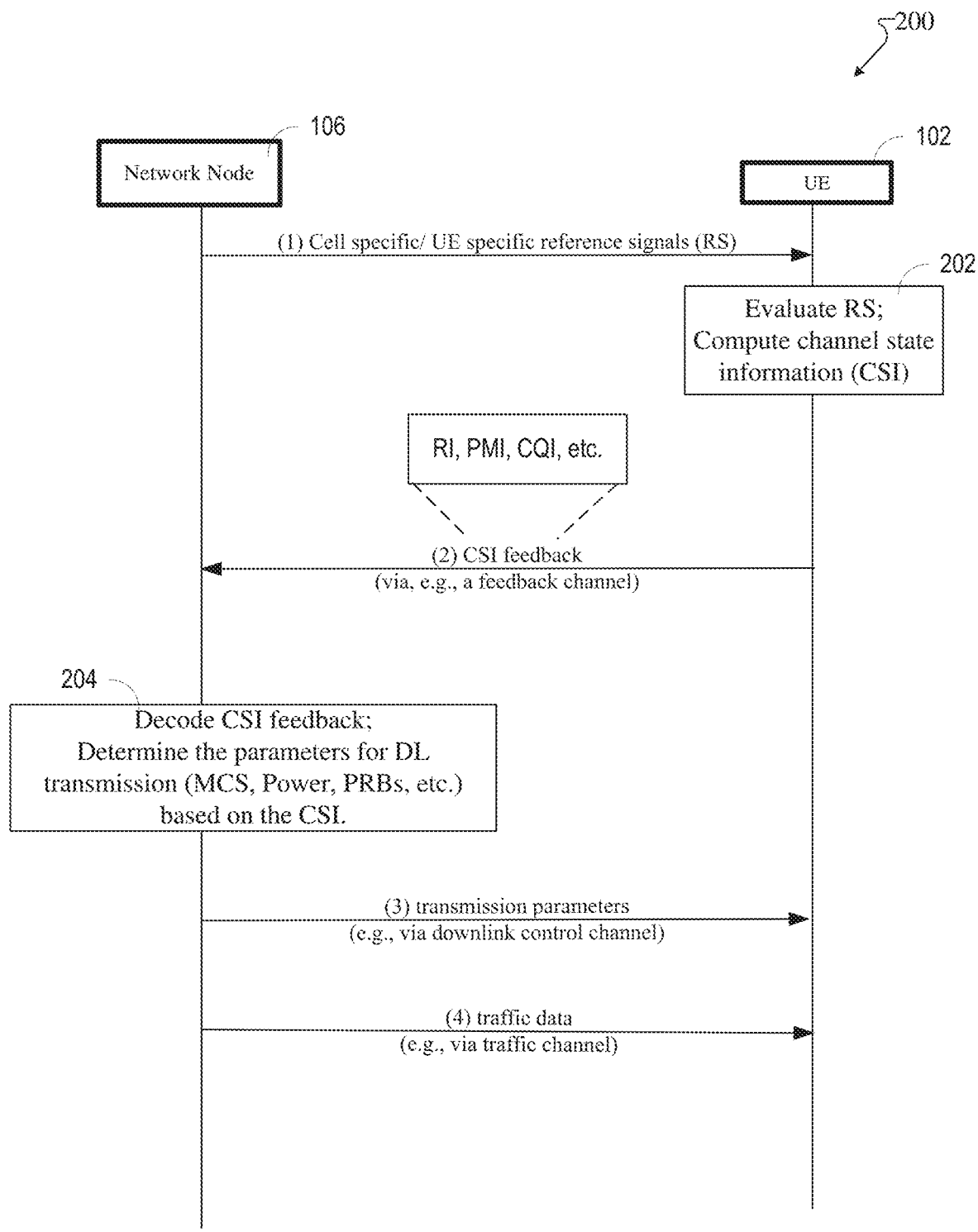
FIG. 2 illustrates an example schematic system block diagram of a message sequence chart between a network node and user equipment according to one or more embodiments.

Referring now to FIG. 2, illustrated is an example schematic system block diagram of a message sequence chart 200 between a network node and user equipment according to one or more embodiments.

FIG. 2 depicts a message sequence chart for downlink data transfer in 5G systems. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI— resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
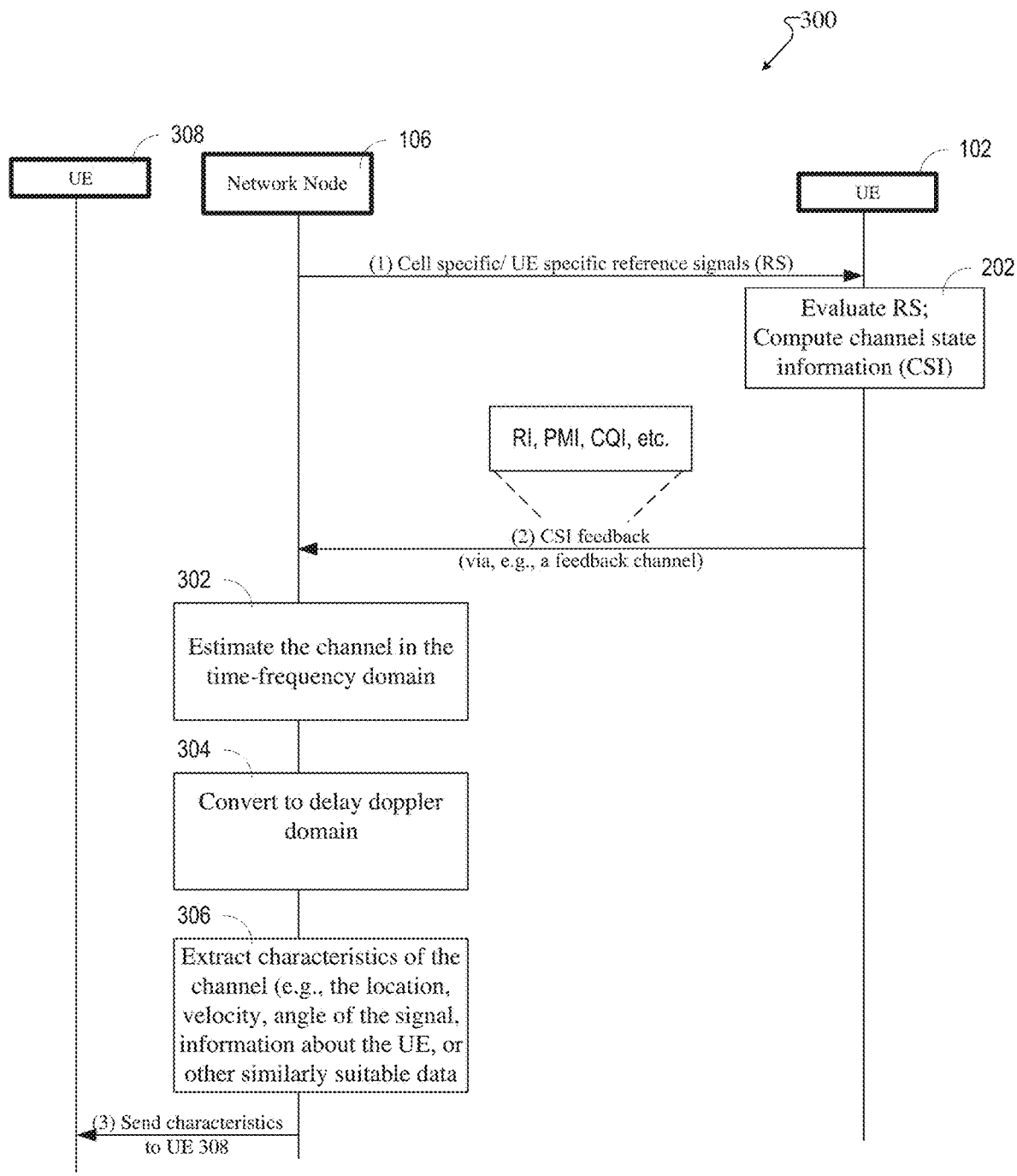
FIG. 3 illustrates an example schematic system block diagram of a message sequence chart between a network node and user equipment comprising a delay doppler conversion via the network node according to one or more embodiments.

Referring now to FIG. 3, illustrated is an example schematic system block diagram of a message sequence chart 300 between a network node and user equipment comprising a delay doppler conversion via the network node according to one or more embodiments.

It should be noted that the reference signal on which the positioning decision is based does not necessarily need to be CSI. CSI can be used on the downlink to perform channel estimation at the UE, and can potentially be used for positioning when it is UE-based (although right now the downlink reference signal is a dedicated positioning reference signal (PRS)), but not necessarily. On the uplink, for example, a sounding reference signal (SRS) can be used for positioning: The base station can send DCI to the UE, and then the UE can send the SRS and the base station can estimates the channel in time frequency domain, and then convert to delay doppler domain. Multiple base stations can receive UE information, and utilize the UE information to localize the UE 102. The information can then be sent to a location server that computes the UEs 102 location. With millimeter waves, as the frequency increases there is more bandwidth available to operators and more antennas used. Therefore, more accuracy can be obtained as the velocity of the UEs increases. For example, if a car is moving and the car is sending signals to the network node 104, (or another car) and the signal can be localized, then once the network node 104 receives the information (or estimates the channel) in the time-frequency domain, the network node 104 can convert the information to the delay doppler domain. Once a representation of the channel is performed in the delay doppler domain it can be very sparse as compared to a representation of the channel in the time-frequency domain. The same channel considered in the delay doppler domain, during a same time window, is sparser than that in the time frequency domain and experiences less variance because it does not change as much. Because the delay doppler domain information does not experience as much variance during the same time window as in the time-frequency domain, in the delay doppler domain, the information can be sent at a different time. Whereas in the time-frequency domain, the information may need to be sent at a specific time due to the high variance.

During uplink positioning at network node 104, after estimating a channel in the time-frequency domain 302, the channel can be converted to the delay doppler domain at block 304, and the characteristics of the channel can be extracted at block 306. The channel characteristics can comprise the location, velocity, angle of the signal, and/or information about the UE.

Alternatively, reference signals can be designed in the delay doppler domain. The reference signals can occupy elements that are orthogonal to data resources elements. Thus, the more reference signals that are added, the more resources are removed from the baseline. However, if the reference signals are designed in the delay doppler domain and then they are transported to the time-frequency domain, then the reference signals can be spread over the time frequency resource elements with the resource elements being overlaid on the data. Although this can increase interference, there can be an increased processing gain. The increased processing gain can allow for the resource elements to be extracted by the network node 104.

It should be noted that this process can be requested by another UE 308. For example, UE 308 can request location data associated with the UE 102, and the network node 104 can send the characteristic data to the UE 308 after extracting the characteristics at block 306. In alternative embodiments, the UE 308 may not request the data, however, the data can be provided from the network node 104 in response to some triggering event, and/or a previously defined criterion. For instance, if the UE 308 is within a certain distance of the network node 104 and/or if the UE 308 is within a certain distance of the UE 102. Alternatively, the characteristic data can be sent in response to a same or similar criterion being placed upon the UE 102.

Figure 4:
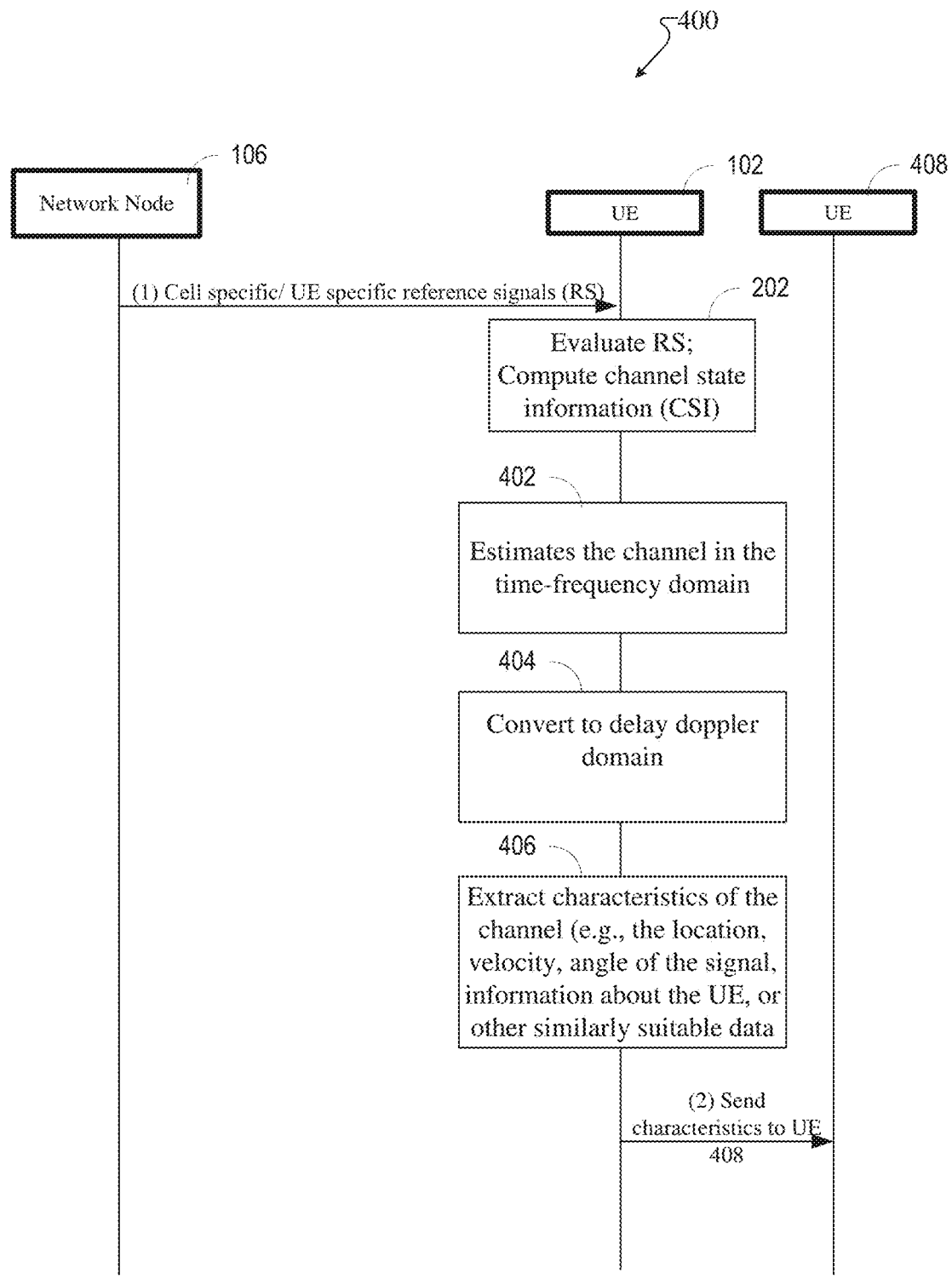
FIG. 4 illustrates an example schematic system block diagram of a message sequence chart between a network node and user equipment comprising a delay doppler conversion via the user equipment according to one or more embodiments.

Referring now to FIG. 4, illustrated is an example schematic system block diagram of a message sequence chart 400 between a network node and user equipment comprising a delay doppler conversion via the user equipment according to one or more embodiments.

In another example, the delay doppler transformation can be applied for downlink positioning, where the channel response is estimated at the UE 102 (instead of the base station), using either reference signal design. During the downlink positioning, the network node 104 can communicate with the UE 102 such that the UE can estimate the channel in the time-frequency domain at block 402 and then convert it to the delay doppler domain at block 404. Thereafter, the UE 102 can extract characteristics of the channel. This channel characteristics can then be sent to UE 408. As noted above, this process can be triggered in response to a request from the UE 408 and/or some other defined criterion.

Figure 5:
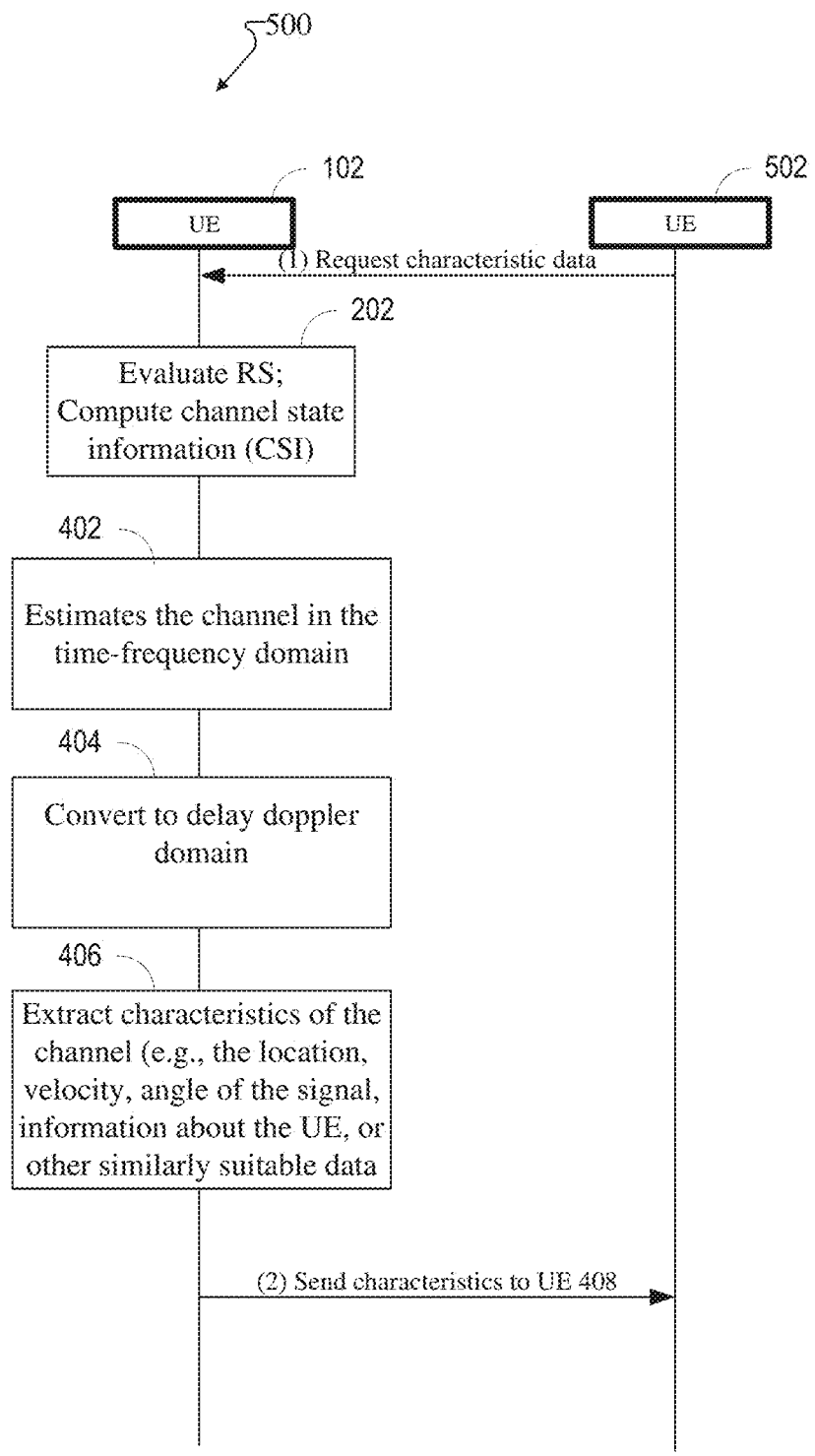
FIG. 5 illustrates an example schematic system block diagram of sidelink communication between vehicles comprising a delay doppler conversion via one of the vehicles according to one or more embodiments.

Referring now to FIG. 5 illustrated is an example schematic system block diagram of sidelink communication 500 between vehicles comprising a delay doppler conversion via one of the vehicles according to one or more embodiments.

In yet another example, the delay doppler transformation can be applied in cooperative localization, through relative positioning between the UEs 102, 502 (e.g., sidelink communication), using either reference signal designs. For example, if there are two cars that are trying to figure out their positions in respect to each other, the cars can utilize the above embodiments (e.g., of FIGS. 3 and 4) where one car can perform like the UE 102 above and the other car can perform like the network node 104 as noted above.

Figure 6:
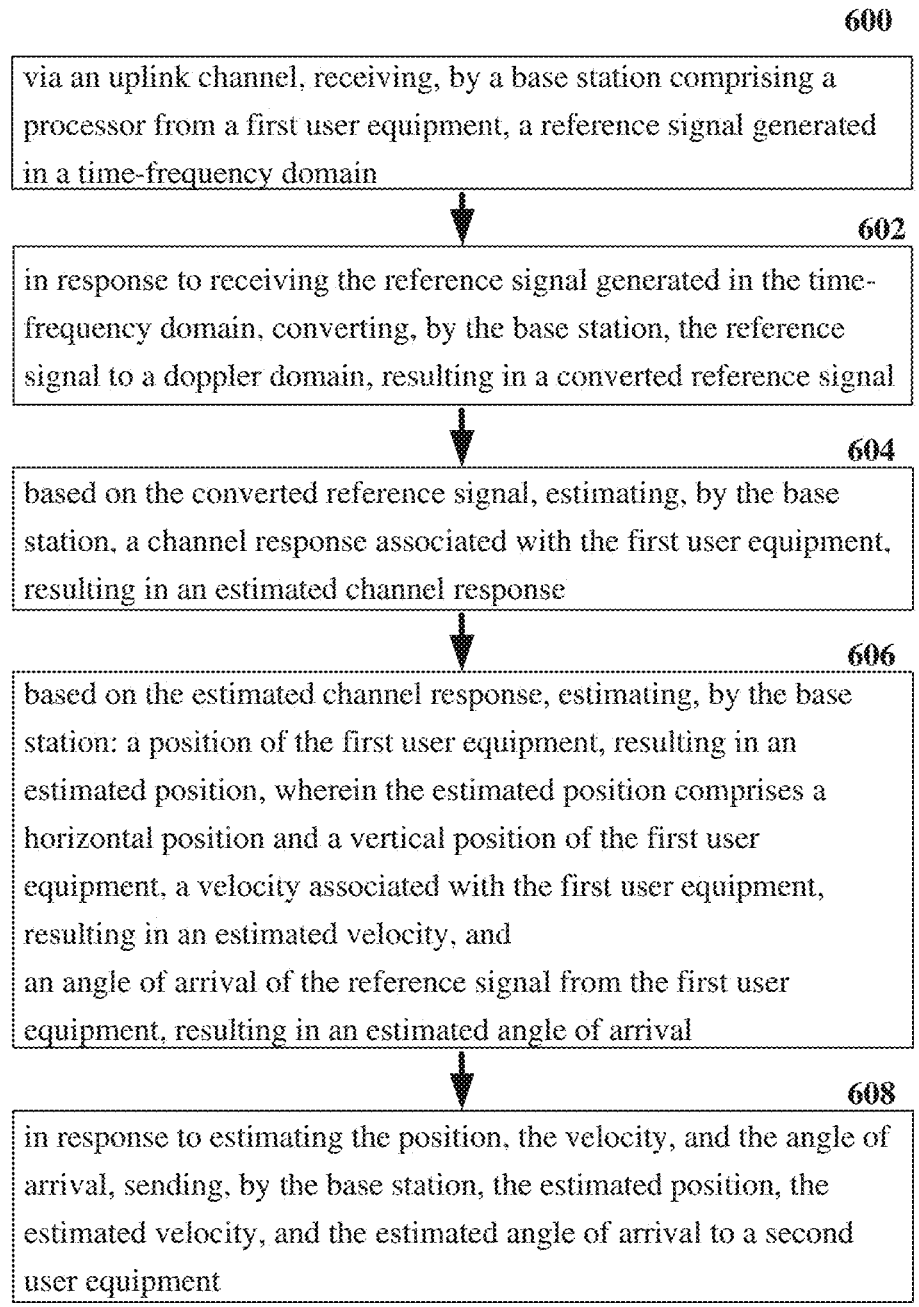
FIG. 6 illustrates an example flow diagram for a method for delay doppler conversion for a 5G network according to one or more embodiments.

Referring now to FIG. 6, illustrated is an example flow diagram for a method for delay doppler conversion for a 5G network according to one or more embodiments.

At element 600, the method can comprise receiving via an uplink channel, by a base station comprising a processor from a first user equipment, a reference signal generated in a time-frequency domain. In response to receiving the reference signal generated in the time-frequency domain, at element 602, the method can comprise converting, by the base station, the reference signal to a doppler domain, resulting in a converted reference signal. Based on the converted reference signal, at element 604, the method can comprise estimating, by the base station, a channel response associated with the first user equipment, resulting in an estimated channel response. Additionally, at element 606, based on the estimated channel response, the method can comprise estimating, by the base station, a position between the first user equipment and the base station, resulting in an estimated position, wherein the estimated position comprises a horizontal position and a vertical position of the first user equipment, a velocity associated with the first user equipment, resulting in an estimated velocity, and an angle of arrival of the reference signal from the first user equipment, resulting in an estimated angle of arrival. Furthermore, in response to estimating the position, the velocity, and the angle of arrival, at element 608, the method can comprise sending, by the base station, the estimated position, the estimated velocity, and the estimated angle of arrival to a second user equipment.

Figure 7:
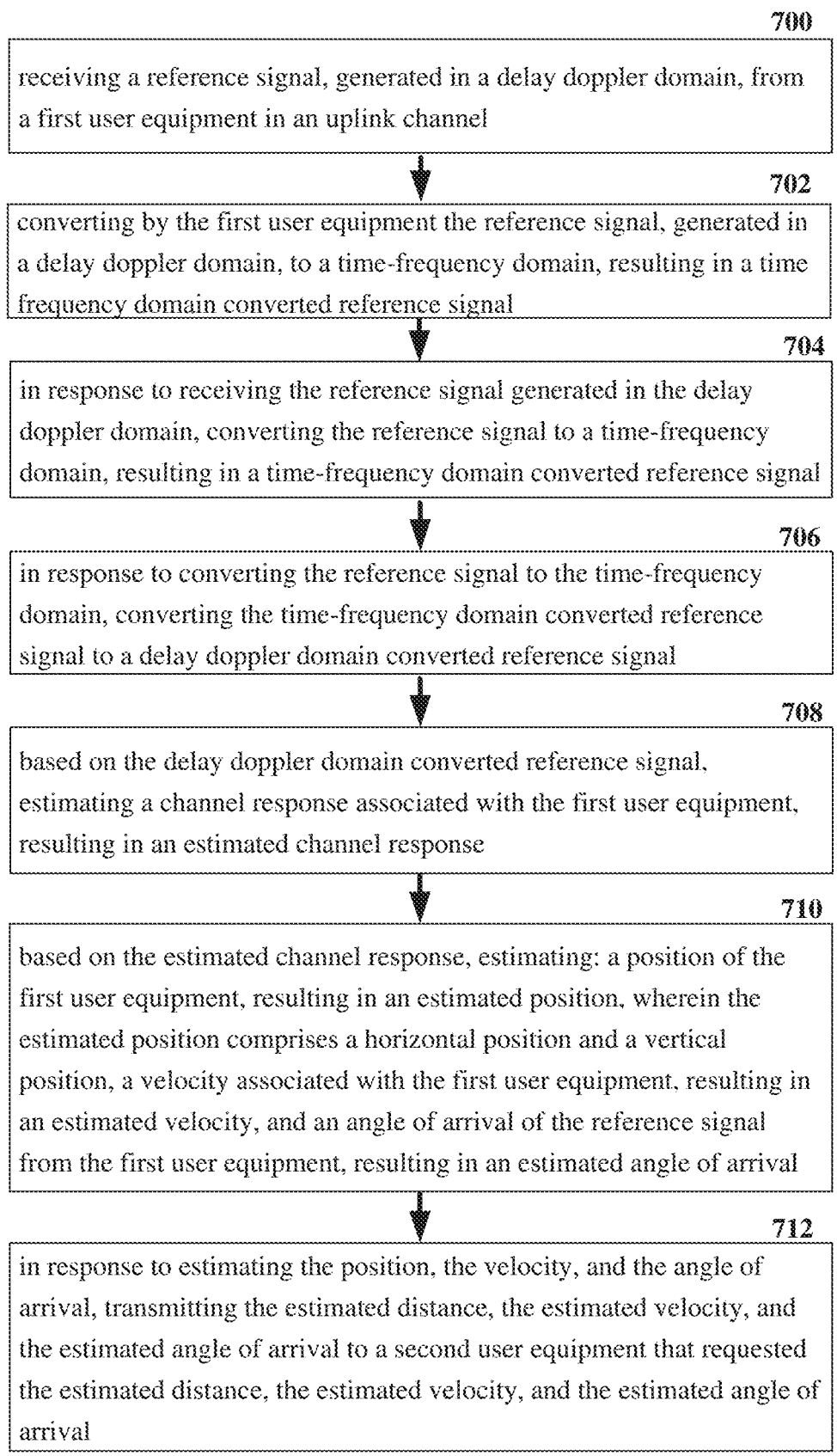
FIG. 7 illustrates an example flow diagram for a system for delay doppler conversion for a 5G network according to one or more embodiments.

Referring now to FIG. 7, illustrated is an example flow diagram for a system for delay doppler conversion for a 5G network according to one or more embodiments.

At element 700 a system can facilitate, receiving a reference signal, generated in a delay doppler domain, from a first user equipment in an uplink channel. The system can comprise converting by the first user equipment the reference signal, generated in a delay doppler domain, to a time-frequency domain, resulting in a time frequency domain converted reference signal at element 702. In response to receiving the reference signal generated in the delay doppler domain, at element 704, the system can comprise converting the reference signal to a time-frequency domain, resulting in a time-frequency domain converted reference signal. In response to converting the reference signal to the time-frequency domain, the operations of the system can further comprise converting the time-frequency domain converted reference signal to a delay doppler domain converted reference signal at element 706. Based on the delay doppler domain converted reference signal, at element 708, the system can comprise estimating a channel response associated with the first user equipment, resulting in an estimated channel response. Based on the estimated channel response, at element 710, the system can comprise estimating: a position the first user equipment, resulting in an estimated position, wherein the estimated position comprises a horizontal position and a vertical position, a velocity associated with the first user equipment, resulting in an estimated velocity, and an angle of arrival of the reference signal from the first user equipment, resulting in an estimated angle of arrival. Furthermore, at element 712, in response to estimating the position, the velocity, and the angle of arrival, the system can comprise transmitting the estimated distance, the estimated velocity, and the estimated angle of arrival to a second user equipment that requested the estimated distance, the estimated velocity, and the estimated angle of arrival.

Figure 8:
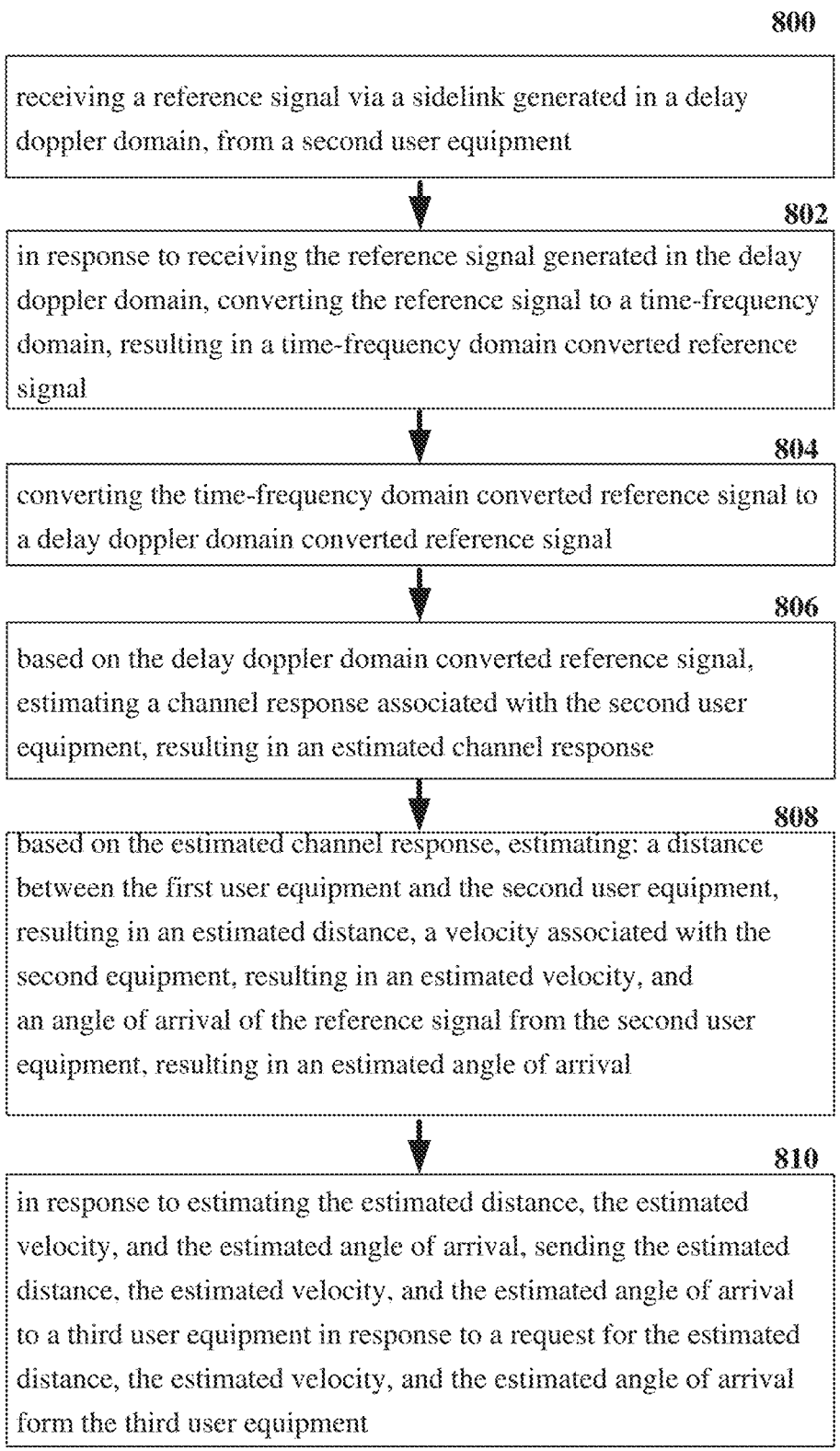
FIG. 8 illustrates an example flow diagram for a machine-readable medium for delay doppler conversion for a 5G network according to one or more embodiments.

Referring now to FIG. 8, illustrated is an example flow diagram for a machine-readable medium for delay doppler conversion for a 5G network according to one or more embodiments.

At element 800, a machine-readable medium can perform the operations comprising receiving a reference signal via a sidelink generated in a delay doppler domain, from a second user equipment. In response to receiving the reference signal generated in the delay doppler domain, at element 802, the machine-readable medium can perform the operations comprising converting the reference signal to a time-frequency domain, resulting in a time-frequency domain converted reference signal. At element 804, the machine-readable medium can perform the operations comprising converting the time-frequency domain converted reference signal to a delay doppler domain converted reference signal. Based on the delay doppler domain converted reference signal, at element 806, the machine-readable medium can perform the operations comprising estimating a channel response associated with the second user equipment, resulting in an estimated channel response. Based on the estimated channel response, at element 808, the machine-readable medium can perform the operations comprising estimating: a distance between the first user equipment and the second user equipment, resulting in an estimated distance, a velocity associated with the second equipment, resulting in an estimated velocity, and an angle of arrival of the reference signal from the second user equipment, resulting in an estimated angle of arrival. Furthermore, at element 810, in response to estimating the estimated distance, the estimated velocity, and the estimated angle of arrival, the machine-readable medium can perform the operations comprising sending the estimated distance, the estimated velocity, and the estimated angle of arrival to a third user equipment in response to a request for the estimated distance, the estimated velocity, and the estimated angle of arrival form the third user equipment.

Figure 9:
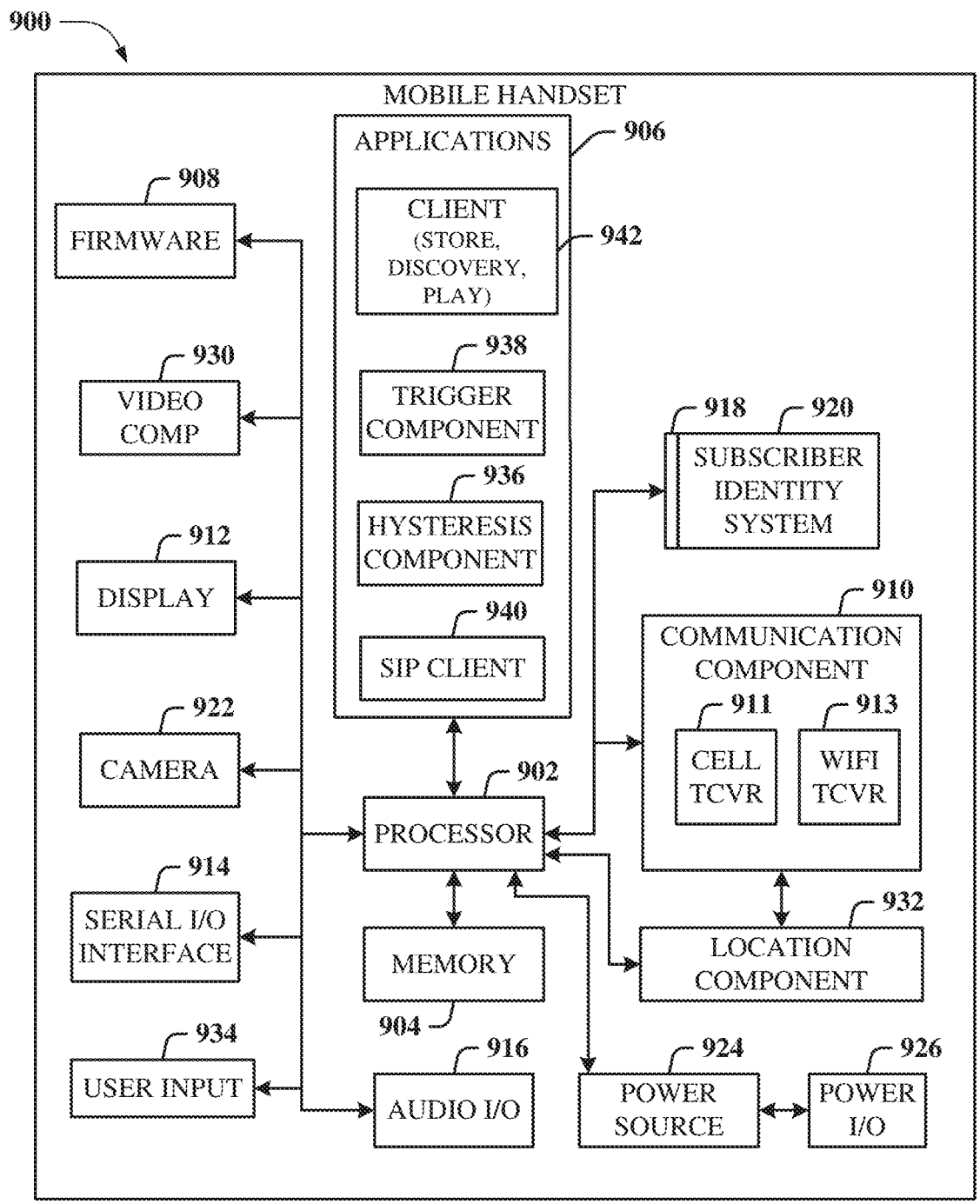
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 99 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
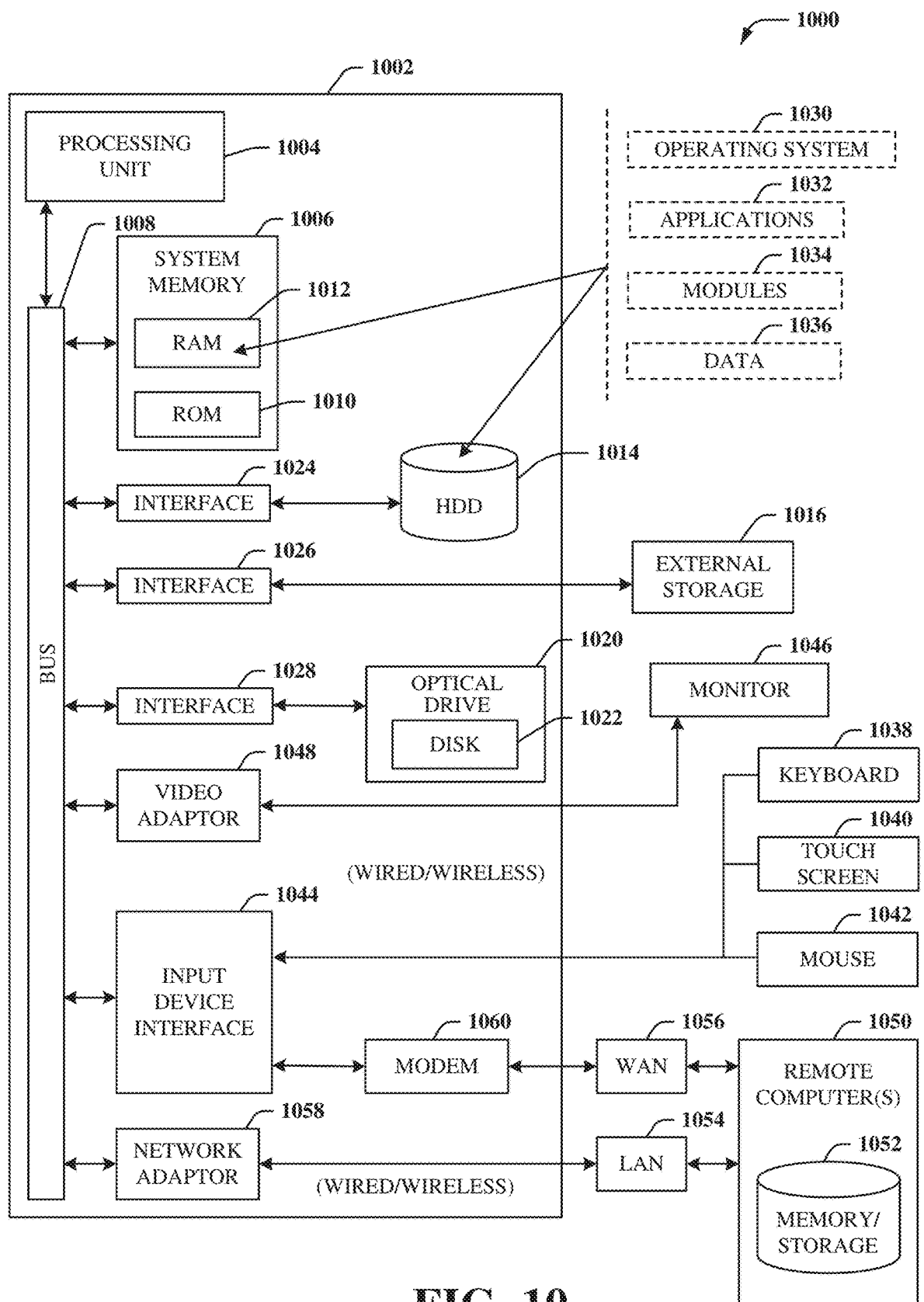
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable media, machine-readable media, and/or communications media, which two terms are used herein differently from one another as follows. Computer-readable media or machine-readable media can be any available media that can be accessed by the computer and includes both volatile and nonvolatile media, removable and non-removable media. By way of example, and not limitation, computer-readable media or machine-readable media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:
1. A method, comprising:
via an uplink channel, receiving, by a base station comprising a processor from a first user equipment, a reference signal generated in a time-frequency domain;
in response to receiving the reference signal generated in the time-frequency domain, converting, by the base station, the reference signal to a doppler domain, resulting in a converted reference signal;

based on the converted reference signal, estimating, by the base station, a channel response associated with the first user equipment, resulting in an estimated channel response;
based on the estimated channel response, estimating, by the base station:
a position of the first user equipment, resulting in an estimated position, wherein the estimated position comprises a horizontal position and a vertical position of the first user equipment,
a velocity associated with the first user equipment, resulting in an estimated velocity, and
an angle of arrival of the reference signal from the first user equipment, resulting in an estimated angle of arrival; and
in response to estimating the position, the velocity, and the angle of arrival, sending, by the base station, the estimated position, the estimated velocity, and the estimated angle of arrival to a second user equipment.

2. The method of claim 1, wherein converting the reference signal to the doppler domain comprises utilizing a symplectic finite fourier transform.

3. The method of claim 2, wherein converting the reference signal to the doppler domain results in a first estimation error that is less than a second estimation error associated with the time-frequency domain.

4. The method of claim 1, further comprising:
increasing, by the base station, a number of ports utilized by the base station from a first number to a second number greater than the first number to refine estimating of the distance.

5. The method of claim 1, further comprising:
in response to converting the reference signal to the doppler domain, facilitating, by the base station, spreading of the reference signal across orthogonal frequency division multiplexing symbols.

6. The method of claim 5, further comprising:
facilitating, by the base station, spreading of the reference signal across subcarriers, wherein spreading the reference signal across the orthogonal frequency division multiplexing symbols and the subcarriers results in an increased reference signal sequence from first reference signal sequence to a second reference signal sequence that is greater than the first reference signal sequence.

7. The method of claim 5, further comprising:
facilitating, by the base station, spreading of the reference signal across subcarriers, wherein spreading the reference signal across the orthogonal frequency division multiplexing symbols and the subcarriers results in an increased processing gain from a first processing gain to a second processing gain that is greater than the first processing gain.

8. Base station equipment, comprising:
a processor; and
a memory that stores executable instructions that, when executed by the processor, facilitate performance of operations, comprising:
receiving a reference signal, generated in a delay doppler domain, from a first user equipment in an uplink channel;
converting by the first user equipment the reference signal, generated in a delay doppler domain, to a time-frequency domain, resulting in a time frequency domain converted reference signal;
in response to receiving the reference signal generated in the delay doppler domain, converting the reference signal to a time-frequency domain, resulting in a time-frequency domain converted reference signal;
in response to converting the reference signal to the time-frequency domain, converting the time-frequency domain converted reference signal to a delay doppler domain converted reference signal;
based on the delay doppler domain converted reference signal, estimating a channel response associated with the first user equipment, resulting in an estimated channel response;
based on the estimated channel response, estimating:
a position of the first user equipment, resulting in an estimated position, wherein the estimated position comprises a horizontal position and a vertical position,
a velocity associated with the first user equipment, resulting in an estimated velocity, and
an angle of arrival of the reference signal from the first user equipment, resulting in an estimated angle of arrival; and
in response to estimating the position, the velocity, and the angle of arrival, transmitting the estimated distance, the estimated velocity, and the estimated angle of arrival to a second user equipment that requested the estimated distance, the estimated velocity, and the estimated angle of arrival.

9. The base station equipment of claim 8, wherein converting the reference signal to the time-frequency domain comprises utilizing a symplectic fourier transform.

10. The base station equipment of claim 8, wherein converting the reference signal to the time-frequency domain comprises overlaying the reference signal with a data resource element in the time-frequency domain.

11. The base station equipment of claim 8, wherein converting the time-frequency domain converted reference signal to the delay doppler domain converted reference signal decreases an overhead of a reference signal transmission from a first overhead value to a second overhead less than the first overhead value.

12. The base station equipment of claim 8, wherein converting the time-frequency domain converted reference signal to the delay doppler domain converted reference signal decreases an estimation error of the base station equipment from a first estimation error to a second estimation error less than the first estimation error.

13. The base station equipment of claim 8, wherein the operations further comprise:
modifying a number of ports utilized by the base station equipment.

14. The base station equipment of claim 8, wherein the operations further comprise:
in response to converting the reference signal to the delay doppler domain, spreading the reference signal across orthogonal frequency division multiplexing symbols and subcarriers.

15. A non-transitory machine-readable medium, comprising executable instructions that, when executed by a processor of a first user equipment, facilitate performance of operations, comprising:
receiving a reference signal via a sidelink generated in a delay doppler domain, from a second user equipment;
in response to receiving the reference signal generated in the delay doppler domain, converting the reference signal to a time-frequency domain, resulting in a time-frequency domain converted reference signal;

converting the time-frequency domain converted reference signal to a delay doppler domain converted reference signal;

based on the delay doppler domain converted reference signal, estimating a channel response associated with the second user equipment, resulting in an estimated channel response;

based on the estimated channel response, estimating:
- a distance between the first user equipment and the second user equipment, resulting in an estimated distance,
- a velocity associated with the second equipment, resulting in an estimated velocity, and
- an angle of arrival of the reference signal from the second user equipment, resulting in an estimated angle of arrival; and in response to estimating the estimated distance, the estimated velocity, and the estimated angle of arrival, sending the estimated distance, the estimated velocity, and the estimated angle of arrival to a third user equipment in response to a request for the estimated distance, the estimated velocity, and the estimated angle of arrival form the third user equipment.

16. The non-transitory machine-readable medium of claim 15, wherein converting the reference signal to the time-frequency domain comprises utilizing a symplectic fourier transform.

17. The non-transitory machine-readable medium of claim 16, wherein converting the reference signal to the time-frequency domain further comprises overlaying the reference signal with a data resource element in the time-frequency domain.

18. The non-transitory machine-readable medium of claim 15, wherein estimating the distance, the velocity, and the angle of arrival is based on a cooperative localization between the first user equipment and the second user equipment.

19. The non-transitory machine-readable medium of claim 18, wherein converting the time-frequency domain converted reference signal to the delay doppler domain converted reference signal decreases an estimation error of the first user equipment from a first estimation error to a second estimation error less than the first estimation error.

20. The non-transitory machine-readable medium of claim 15, wherein converting the time-frequency domain converted reference signal to the delay doppler domain converted reference signal increases a signal interference to noise ratio from a first signal interference to noise ratio greater than a second signal interference to noise ratio.

* * * * *